US006424838B1

(12) United States Patent
Stobbe et al.

(10) Patent No.: US 6,424,838 B1
(45) Date of Patent: Jul. 23, 2002

(54) PROCESS AND CONFIGURATION FOR DETECTING A TRANSPONDER WITH REFERENCE TO A PARTICULAR CELL OF TWO ADJACENT OVERLAPPED CELLS

(76) Inventors: Anatoli Stobbe, Steinradweg 3; Holger Merk, Distelweg 11, both of D-30890 Barsinghausen (DE)

( * ) Notice: Subject to any disclaimer, the term of this patent is extended or adjusted under 35 U.S.C. 154(b) by 0 days.

(21) Appl. No.: 09/322,710

(22) Filed: May 28, 1999

(30) Foreign Application Priority Data

Jun. 2, 1998 (DE) .......................................... 198 24 528

(51) Int. Cl.$^7$ ................................................. H04Q 7/20
(52) U.S. Cl. ...................... 455/456; 455/73; 455/67.6; 455/457; 340/825.49; 342/44; 342/442
(58) Field of Search ...................... 455/422, 73, 456, 455/67.1, 67.6, 457, 427, 428, 430; 342/44, 442, 42; 340/825.49, 825.37, 573.4

(56) References Cited

U.S. PATENT DOCUMENTS

| | | | |
|---|---|---|---|
| 4,918,432 A | * 4/1990 | Pauley et al. | 340/573 |
| 5,568,119 A | * 10/1996 | Schipper et al. | 340/825.37 |
| 5,640,151 A | * 6/1997 | Reis et al. | 340/825.54 |
| 5,874,896 A | * 2/1999 | Lowe et al. | 340/572 |
| 6,150,921 A | * 11/2000 | Werb et al. | 340/10.1 |
| 6,181,253 B1 | * 1/2001 | Eschenbach et al. | 340/825.37 |

* cited by examiner

Primary Examiner—Thanh Cong Le
Assistant Examiner—Lana Le
(74) Attorney, Agent, or Firm—Flanagan & Flanagan; John R. Flanagan

(57) ABSTRACT

A process and configuration used therein for detecting a transponder in a detection region, structured into two adjacent overlapped cells, provide for detecting the transponder with reference to a particular one cell of the two cells. The detecting process includes the steps of: providing in each of the cells a field with a detectable field characteristic; acquiring the field characteristic of a first of the cells using a sensing unit of the transponder; cyclically transmitting a response signal from a transmitting unit of the transponder containing the acquired field characteristics; receiving the response signal by a receiver which contains response signal information regarding the acquired field characteristic, namely that of the field of the first cell, that of the field of the adjacent cell or an unknown field characteristic; evaluating the response signal with respect to the information of the acquired field characteristic contained in the receiver; comparing the acquired field characteristic with the field characteristics provided in the cells; determining the possible position(s) of the transponder on the basis of the results of the performed comparison; and verifying a position determination, wherein, after detection of a transponder in the first cell, the field characteristic of the adjacent cell is adjusted such that it differs from that of the first cell.

20 Claims, 5 Drawing Sheets

PROCESS AND CONFIGURATION FOR DETECTING A TRANSPONDER WITH REFERENCE TO A PARTICULAR CELL OF TWO ADJACENT OVERLAPPED CELLS

BACKGROUND OF THE INVENTION

1. Field of the Invention

The invention relates to the field of detecting one or several transponders in a predetermined detection region. Within the scope of this technical field the invention relates, in particular, to a process for detecting one or several transponders in a detection region structured into at least two cells, in which a transponder can be detected with reference to a particular cell, as well as a configuration for detecting one or several transponders in a predetermined detection region.

2. Description of the Prior Art

A process for determining the position of a mobile telephone registered as a known telephone within a specific network and referred to as a transponder is used, for example, in the network operation of GSM mobile telephones. The transmitting range of the network provider—the detection region—is divided into discrete cells. With each cell is associated a transmitting/receiving unit (fixed station) via which the telephone operation is handled in this cell on a frequency specific to this cell. In this respect each cell differs with respect to frequency from the adjacent cells. When a mobile telephone is put into operation in such a cell, it is identified at the network end by transmission of its identity such that with the aid of this identification and knowing the fixed station which has received this identification, it is possible to determine in which cell of the detection region this mobile telephone is located. If the mobile radio subscriber crosses the boundary of such a cell with his transmission- or reception-ready mobile telephone and enters the next adjacent cell, his identification data are received by another fixed station such that it is possible to determine at the network end that this mobile telephone is now within this adjacent cell. However, due to a desired overlapping of the cells, a mobile telephone does not change its frequency at the cell boundary proper but rather only after it is, in fact, already within the adjacent cell. By a time-recursive comparison of the mobile telephone positions it is possible to trace the executed motions retroactively. For carrying out such a process it is therefore necessary that the mobile telephone can operate on all frequencies made available by the network provider. The equipment expenditures required are not inconsiderable.

The communication between a mobile telephone and the fixed station of such a cell takes place on HF bands. Through alternative orientation of the antennas between the mobile telephone and a fixed station associated with a cell, and through shadowing due to environmental factors, reflections as well as differing climatic conditions, the actual course of the cell boundaries often deviates considerably from the theoretical cell boundaries. Factors which cannot be influenced, for example, differing and continuously changing weather conditions, however, lead to the fact that the cell boundaries change continuously. If a mobile telephone is located in the margin area of a first cell, communication can take place in ways that cannot be affected alternatively with the fixed station of the first cell and with the fixed station of the adjacent cell. This gives the impression that the mobile telephone migrates back and forth from one cell into the other, suggesting a situation which, in fact, does not exist. The position detected in this case does not correspond to the actual position.

There are applications in which it is necessary to acquire a highly precise detection of the transition of a transponder from one cell into an adjacent cell.

SUMMARY OF THE INVENTION

Building on the above-discussed prior art, the invention is therefore based on the task of proposing a process for detecting one or several transponders in a detection region structured into at least two cells, according to which the transition of the transponder from a first cell into a second cell is improved. The invention is further based on the task of providing a corresponding configuration as well as a preferred use of such configuration.

The task with reference to the detecting process is solved according to the invention by the provision of a process for spatially-resolved detecting a transponder in a detection region structured into at least two adjacent regionally-overlapped cells in which the transponder is detectable with reference to a particular one of the cells. The detecting process comprises the following steps of: (a) providing in each of the at least two adjacent overlapped cells a field with a detectable field characteristic; (b) acquiring the field characteristic of a first of the cells using a sensing unit of the transponder; (c) cyclically transmitting a response signal from a transmitting unit of the transponder containing the acquired field characteristics; (d) receiving the response signal by a receiver which contains response signal information regarding the acquired field characteristic; (e) evaluating the response signal with respect to the information of the acquired field characteristic contained in the receiver; (f) comparing the acquired field characteristic with field characteristics provided in the cells; (g) determining the possible position(s) of the transponder on the basis of the results of the performed comparison; and (h) verifying a position determination, wherein, after the detection of a transponder in the first cell, the field characteristic of the adjacent cell is adjusted such that it differs from that of the first cell.

The task with reference to the configuration is solved according to the invention through the provision of a configuration for detecting a transponder in a detection region structured into at least two adjacent regionally-overlapped cells in which the transponder is detectable with reference to a particular one of the cells. The configuration comprises: (a) a plurality of stationary field-generating devices each associated with a respective one of the cells and for generating a field with detectable field characteristics changing at predetermined time intervals, the devices being operable with identical field characteristics as well as with differing field characteristics; (b) a transponder having a sensing unit operable for acquiring detectable field characteristics or changes thereof and a transmitting unit operable for transmitting response signals in response to the operation of the sensing unit; (c) a receiver for receiving the response signals transmitted by the transmitting unit; and (d) a control and memory device connected to the field-generating devices for driving the field-generating devices and connected to the receiver for evaluating the response signals received by the receiver.

As mentioned above, the detecting process according to the invention uses at least two adjacent cells which regionally overlap and thus form an overlap region. For the sake of simplifying the explanations, in the following description the detecting process on the border of two adjacent cells will be discussed. In each cell a field of magnetic or electromagnetic type is provided. The fields are structured identically and comprise a detectable field characteristic which differ, for example, by different phase positions. In the case of such a field characteristic, only one frequency need be made available. The field characteristic in each cell is thus known. This field characteristic is acquired by the sensing unit associated with the transponder. A transmitting unit also associated with transponder cyclically transmits a response signal having information regarding the acquired field characteristic of the field in a cell. The reception of this response signal indicates that a transponder is located in the field or in the cell having this field characteristic. The field-generating device of the adjacent second cell is now driven such that the field characteristic to be detected of the field in this cell is different from the field characteristic of the field in the first cell.

The two fields of the adjacent cells overlap in the overlap region such that therein a third field characteristic is developed which differs from the field characteristics of the fields of the bordering cells. In contrast to prior known detection processes, here the superimposed field characteristics are utilized as position information. Such a superposition can, for example, also be a cancellation. The superposition regions form a spatially sharp boundary to the bordering fields or cells such that a higher spatial resolution is possible compared to prior known processes for the detection of transponders. If the transponder is moved from the first cell into the overlap region and subsequently into the adjacent second cell, the transponder transmits first the response signals representing the field characteristic of the first cell and, subsequently when it is located in the overlap region, it transmits response signals which are neither assigned to the one nor to the other cell and, upon entering the second cell it transmits such response signals which correspond to the field characteristics of the second cell. The information received in each response signal is verified, for example, by comparison with that of the previously received response signal. If the information received in two successive response signals is identical, the transponder is still located within the same cell or within the same cell region or also in the overlap region. Since the field characteristics of the first cell as well as also of the second cell are known, the transponder is in this case clearly and unambiguously in the second cell if, after transmitting response signals with the information characteristic for the overlap region, it has transmitted repeatedly response signals with the information appropriate for the field characteristic of the second cell. Thus the transition of the transponder from the first cell into the second cell is also detectable. The output of a control signal indicating that the transponder is located in the second cell, usefully takes place only after repeated reception of the response signal typical for the field characteristic of the second cell. The number of the repeated receptions is predetermined.

The detecting process according to the invention, and also correspondingly the configuration according to the invention, can be realized preferably in detection regions of relatively small orders of magnitude wherein a preferred use of such a configuration is intended to detect in spatial resolution a transponder serving as a security tag on merchandise in the exit region of a building in order to determine at which point in time a transponder is, in fact, outside the building. Such information is essential if the transponders are used within a theft protection system as security tags on merchandise to safeguard goods disposed in the building. In such a case the first cell of the detection region is inside the building and the second cell outside the building; the overlap region is disposed so as to cover the door area of the building. Through different field strengths of the two adjacent fields the overlap region can be adapted to the particular circumstances.

An exemplary embodiment provides that the fields in the adjacent cells are formed by low-frequency electromagnetic radiation which in the cells is of the same frequency and synchronous. As a detectable field characteristic the phase position of a field in a cell is used such that with a field adjustment in which adjacent cells contain different fields with respect to their field characteristics, these fields differ with respect to their phase positions. In this case a phase jump between the phase position of the first field and that of the second field is detectable by the transponder.

Especially preferred is an embodiment in which the phase position of fields of adjacent cells are offset by 180° with respect to each other. In this case, the overlap region is characterized by a field cancellation, in which region thus no phase position is recognized. A transponder can in this case differentiate between three phase positions: "phase position 0°", "phase position 180°", and "phase position unknown". The phase positions, offset by 180° with respect to one another, of the two overlapping fields causes the cancellation region to be delineated very sharply from the cell regions proper with respect to a detection of the phase position inherent to these cells. The boundary region between the cell region proper and the overlap region is only a few centimeters. It is therefore possible to determine very precisely, given the appropriately dimensioned overlap region, when a transponder is moved from the overlap region into the cell region proper of a bordering cell. If such a configuration is used within the scope of an above denoted theft protection system, the building boundary can be set up by the corresponding dimensioning of the overlap region such that, after it has been determined with certainty that a transponder is outside of the building, an alarm can already be triggered at a point in time at which the transponder is just directly outside in front of the building door.

When such a configuration is used within the scope of such a theft protection system, it is useful if the spatially-resolved detection process of the transponder is preceded by an anti-collision and identification process. When such an anti-collision and identification algorithm conventionally terminates, therewith the transponder is brought into quiescent mode. If an anti-collision and identification process is succeeded in time by such a spatially-resolved detection process, it is useful not to switch the transponder into sleep mode after the communication is completed but rather to switch it into detection mode.

With the above-described spatially-resolved detection process it can occur that through specific spatial positions of the transponder antenna when moving the transponder through the cells, in particular in the proximity of the overlap region, the field characteristic of an LF transmitter is detected, which field characteristic differs from that of the cell in which the transponder is, in fact, located. In these cases an unknown or false field characteristic is detected by the transponder even though the transponder is, in fact, not in the overlap region. To avoid these cases, each cell is divided into two or more subcells. Each subcell comprises its own field-generating device, for example an LF transmitter. It is further possible to divide a cell within the scope of its subcells by impressing the subcells with fields of differing field characteristics in spatial resolution. When using LF transmitters, the fields of the subcells of one cell are first provided with the same frequency, synchronously and in phase, and that only if a response signal with a first phase position is received by the transponder, the fields of adjacent subcells have different field characteristics, for example different phase positions. The field characteristics of the subcells are subsequently switched back and forth between providing same-phase and different-phase subcells. It would be possible to assign a transponder localized according to protocol repeatedly to the same field characteristic or the same subcell through the response signal transmitted by it. A transponder which assumes alternating positions with each switching-over of the cell operation, which alternating operation toggles in the millisecond range, is initially classified as not being uniquely detectable. However, since such a transponder is moved, it unavoidably is also moved into a cell or subcell region in which it is detectable according to protocol.

When using LF transmitters for providing electromagnetic fields, frequencies between 1 kHz and a few hundred kHz are in particular suitable. For transmitting the response signals of the transponders an HF channel is usefully employed which can be, for example, 433 MHz.

These and other features and advantages of the invention will become apparent to those skilled in the art upon a reading of the following detailed description when taken in conjunction with the drawings wherein there is shown and described exemplary embodiments of the invention.

BRIEF DESCRIPTION OF THE DRAWINGS

In the following detailed description, reference will be made to the attached drawings in which.

DETAILED DESCRIPTION OF THE INVENTION

Figure 1:
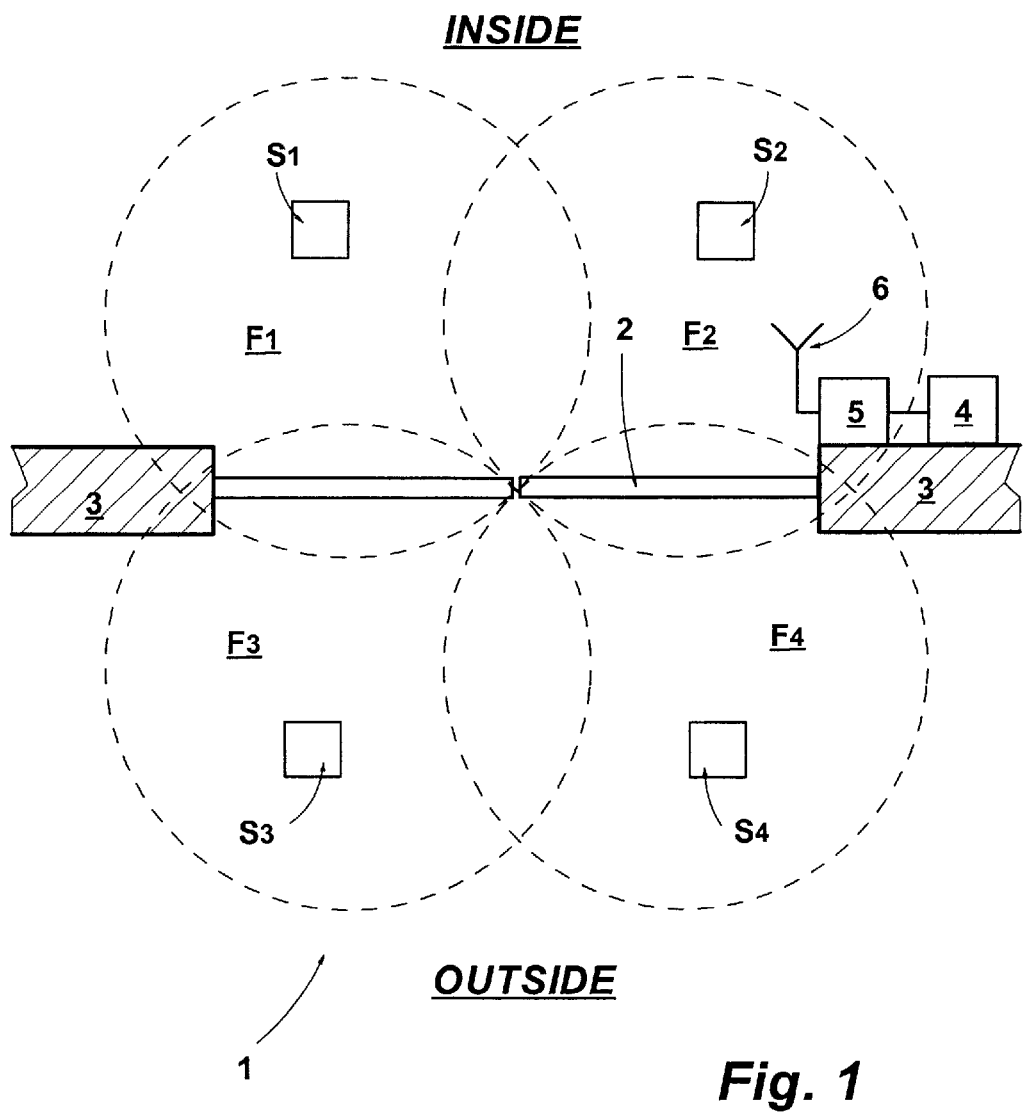
FIG. 1 is a schematical representation of a configuration for the spatially-resolved detecting according to the invention of one or several transponders in the door area of a building.

Referring to the drawings, and particularly to FIG. 1, there is depicted a configuration, generally designated 1, for spatially-resolved detecting one or more transponders which, in accordance with a preferred embodiment of the invention, serves for safeguarding a sliding door 2 forming the exit of a building not further shown. The sliding door 2 may border on an outer wall 3 of the building and open automatically when a person approaches. The interior of the building is denoted in FIGS. 1 and 2 to 5 by the designation "inside" and the region outside of the building by the designation "outside". The configuration 1 comprises a control and memory device 4, a receiver 5 having a receiving antenna 6, and a plurality of transmitters $S_1$–$S_4$ (for example four in number) operating in the low frequency (LF) range. The receiver 5 and transmitters $S_1$–$S_4$ are connected to the control and memory device 4. The two LF transmitters $S_1$ and $S_2$ are disposed within the interior of the building; the two LF transmitters $S_3$ and $S_4$ are located outside of the building. The LF transmitters can be disposed, for example, beneath a ceiling or beneath the roof cover of a door. The transmission range—in the following also referred to as fields—are denoted by the reference symbols $F_1$–$F_4$. The transmission range $F_1$–$F_4$ of each LF transmitter $S_1$–$S_4$ is structured approximately spherically with respect to the LF transmitters $S_1$–$S_4$ disposed on the underside of the ceiling. Projected onto the plane of the floor of the building and the outside region in front of it, the transmission ranges $F_1$–$F_4$ are thus represented schematically as circular areas. Based on the configuration of the transmission ranges $F_1$–$F_4$, it is evident that these mutually overlap. The transmission ranges $F_1$–$F_4$ represent cells or subcells, respectively, of the detection region of the configuration 1.

The control and memory device 4 serves for impressing the LF transmitters $S_1$–$S_4$ with predetermined transmission signals and all LF transmitters $S_1$–$S_4$ transmit cyclically the same signal at the same frequency synchronously. The receiver 5 operates in the high-frequency range and its HF receiving antenna 6 is disposed within the detection region of the configuration 1 such that response signals transmitted by a transponder P are receivable on this HF channel by the HF receiving antenna 6 of the receiver 5.

Figure 1A:
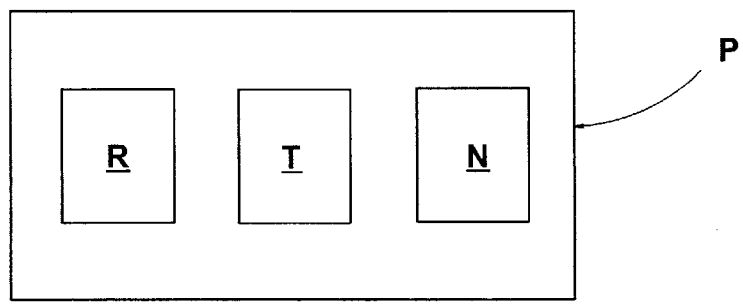
FIG. 1A is a schematical representation of a transponder having a receiving unit, sensing unit and transmitting unit associated therewith.

The transponder P, as schematically represented in FIG. 1A, that cooperates with the configuration 1 is attached as a security tag of merchandise on an item located in the building. The transponder P comprises a receiving unit R, a transmitting unit T and a sensing unit N. The receiving unit R operates in the low-frequency range. The sensing unit N is operable for acquiring the field characteristics or the differences of the field characteristics. The transmitting unit T operates in the high-frequency range for transmitting response signals on the HF channel of the receiver 5 which contain the acquired field characteristics. The LF receiving unit R of the transponder P serves in particular for the purpose of switching the transponder P, upon entering the detection region, from a sleep mode to an operating mode—thus, to wake it up—and in order to be able subsequently to carry out communication with the control and memory device 4. This communication can also be carried out on an HF channel if relatively large data quantities are to be transmitted. These devices of the transponder P serve for realizing an anti-collision and identification process with the control and memory device 4.

In FIGS. 2 to 5, for the sake of clarity only, the detection region of configuration 1 is shown with differently structured fields $F_1$–$F_4$ during the detection of a transponder. The detection region of configuration 1 is divided into an inside detection cell and an outside detection cell. The inside detection cell is formed by the transmitting range $F_1$ and $F_2$ of the two LF transmitters $S_1$ and $S_2$ and the outside detection region through the transmitting ranges $F_3$ and $F_4$ of the LF transmitters $S_3$ and $S_4$. A transponder, not further shown, is located in an exit position in the interior of the building and is moved toward the detection region of configuration 1; in the exemplary embodiment shown it is located in position 1 (depicted as a dark circle with a number in it). The path on which the transponder is moved is indicated by dotted lines in FIGS. 2 and 3. From this position 1 the transponder arrives in field $F_1$ in which it is identified in conformance with a given algorithm, and is subsequently switched into the detection mode. In the detection mode the transponder is subsequently moved toward the exit of the building and is disposed, for example, at position 2.

The LF transmitters $S_1$ and $S_2$ are driven by the control and memory device 4 such that these transmit cyclically a signal which is of the same frequency, is synchronous and in phase. Consequently, the fields $F_1$ and $F_2$ are generated and form a directed field in the inside detection cell. The transponder which is in detection mode acquires this signal ("phase position 0°", "phase position 180°" or "phase position unknown") with the sensing unit N associated with it and transmits on the HF channel a response signal containing this information to the receiver 5. Through the received response signal the control and memory device 4 registers that a transponder is located in the first cell. For the spatially-resolved detection of several transponders, a time-slot controlled processing of the response signals transmitted by the individual transponders takes place with each transponder having its own time slot assigned to it for carrying out the spatially-resolved detection process.

The response signal transmitted by the transponder is structured as a pulse or a pulse sequence. For conveying the different response information, the pulses differ with respect to their length and/or with respect to their pulse sequence. Since the response signal information only needs to contain three states, namely the state "phase position 2°", "phase position 180°", or "phase position unknown", the time slot provided for the response signal of a transponder need only be dimensioned to be very short so that even the response signals of numerous transponders, one succeeding the other in their particular time slots, can be acquired in short time.

In the control and memory device 4 the response signals of a transponder are stored up to a predetermined time interval so that a comparison of the information of a received response signal can be carried out with that of the previously received response signals of this transponder. This permits a detection verification to the extent that a transponder which transmits several times the same response signal is uniquely detectable with respect to its position. The focus of the exemplary embodiment shown is the determination of the time at which the transponder has passed the sliding door 2 and is thus located in the detection cell formed by the fields $F_3$ and $F_4$ located outside of the building.

Figure 2:
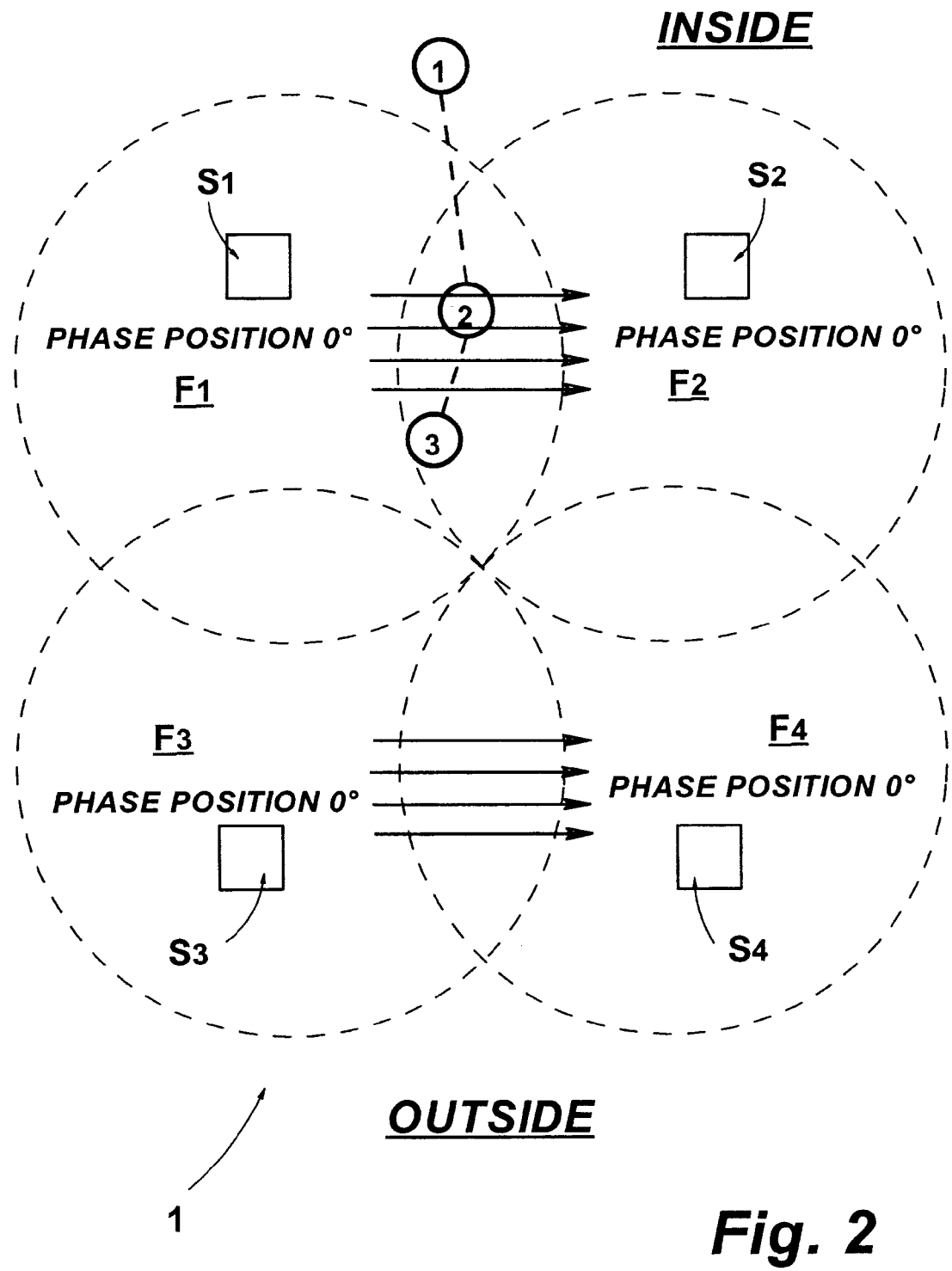
FIG. 2 is a simplified representation of FIG. 1 depicting the formation of two cells with directed fields during transmission of in-phase signals.

When the transponder is moved from its position 2 into its position 3 as shown in FIG. 2, the transponder sends in each instance the same response signal information, namely that no phase jump has been detected on this path within the scope of the cyclical query.

Figure 3:
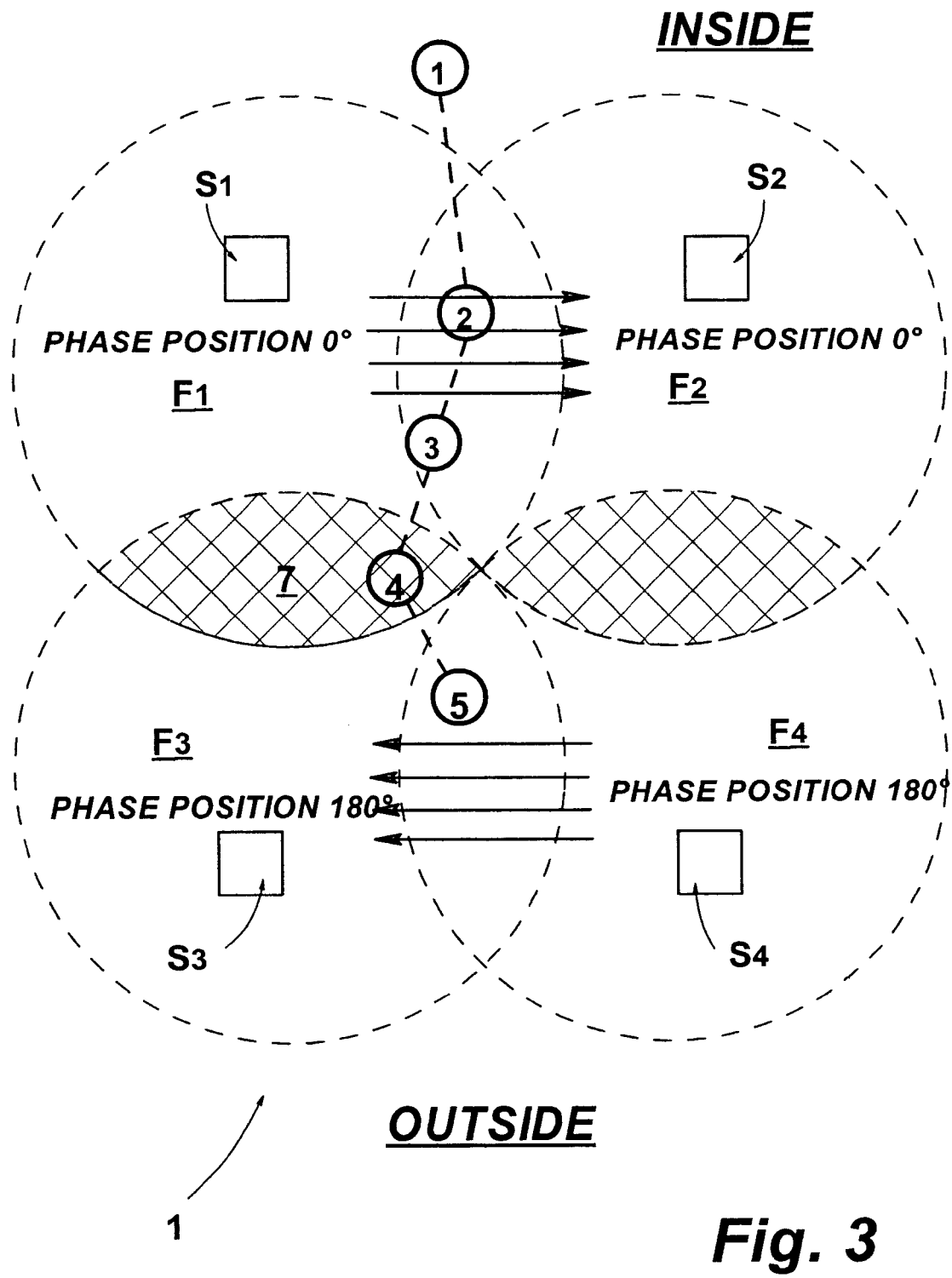
FIG. 3 is a representation corresponding to FIG. 2 in which one of the two directed fields is impressed with a phase offset by 180° with respect to the other cell.
Figure 4:
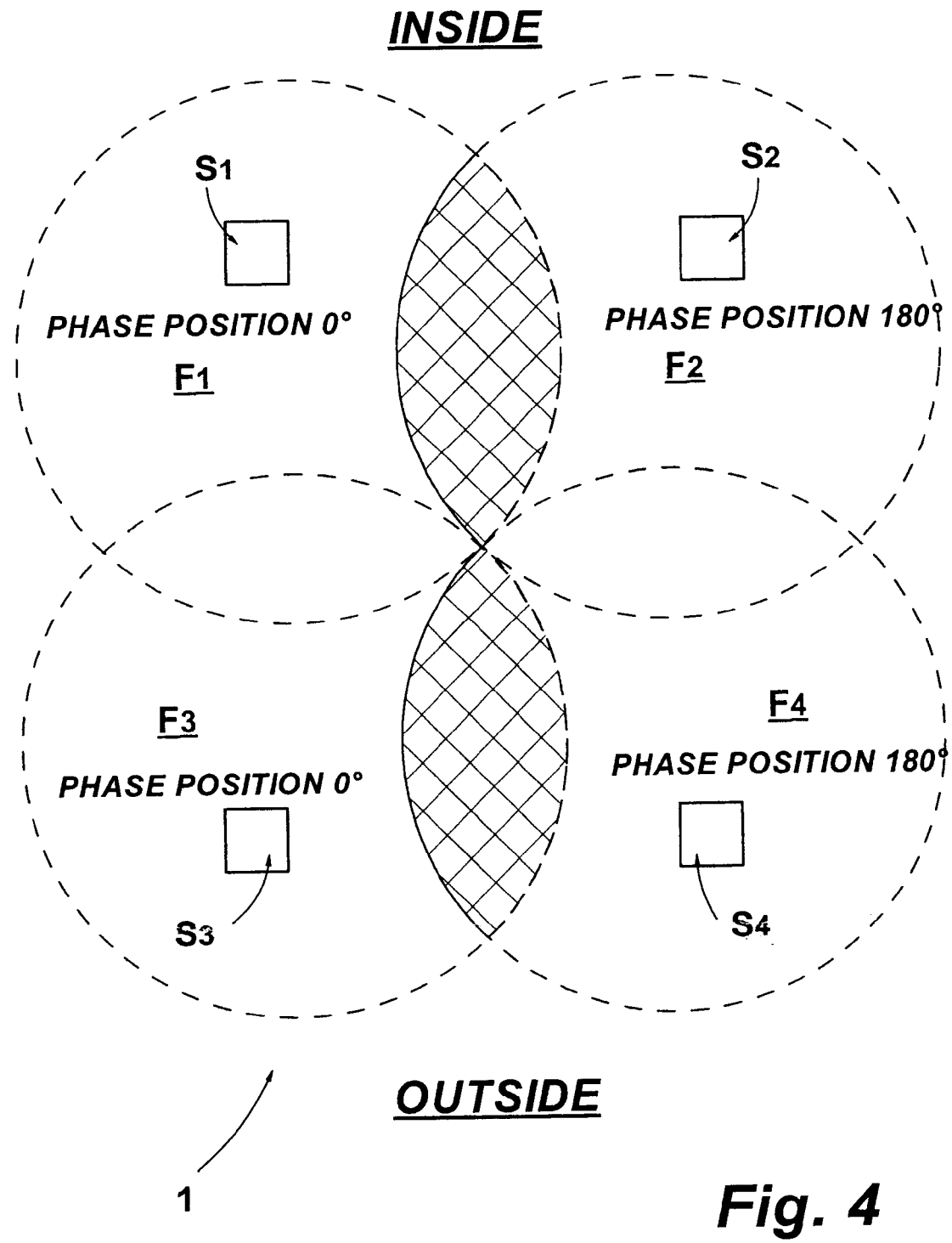
FIG. 4 is a representation of a division of each of the two cells into two subcells by impressing the two LF transmitters disposed in a cell with signals different in phase.
Figure 5:
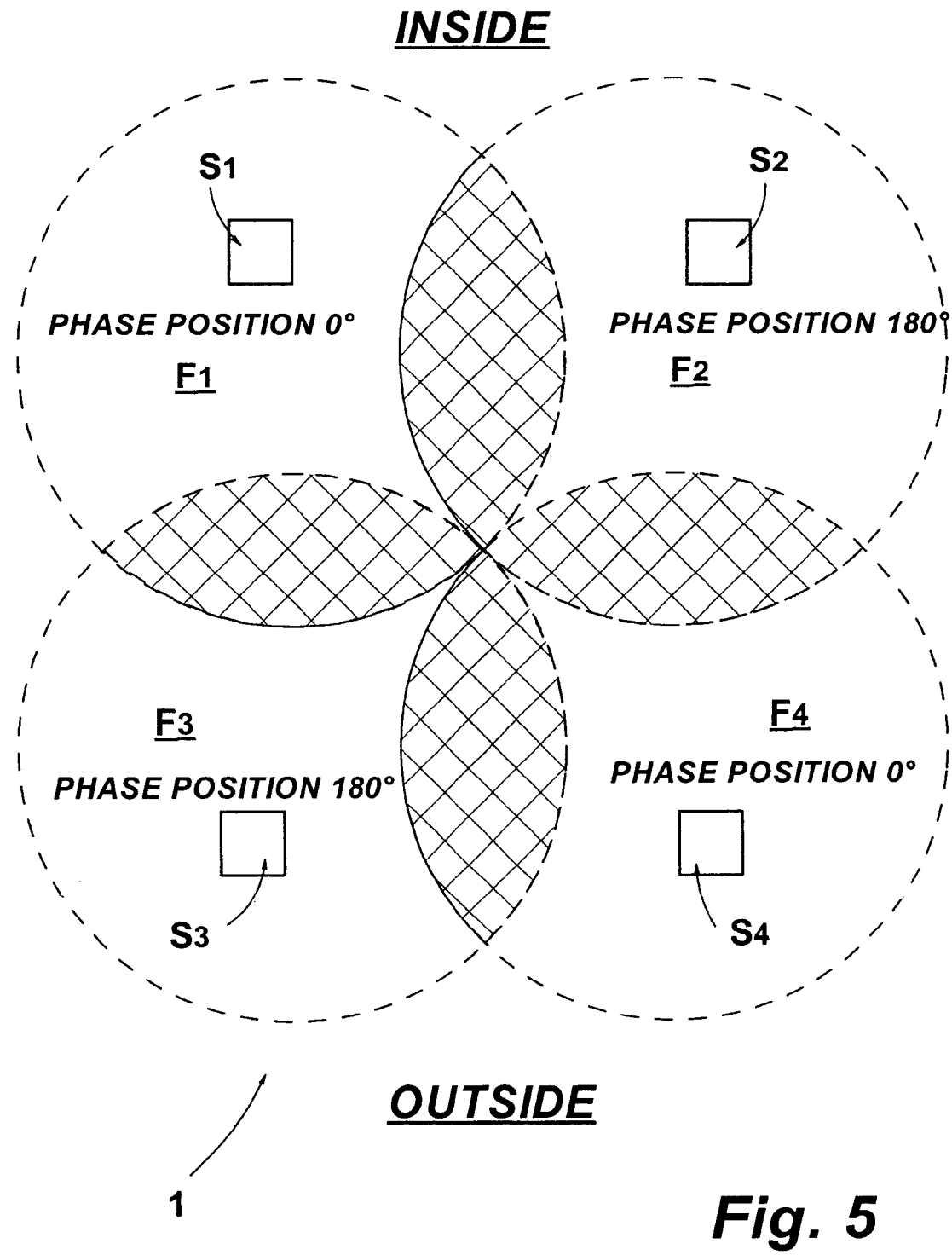
FIG. 5 is a representation corresponding to FIG. 4, in which the phase position in each subcell is offset by 180° with respect to the phase position of two adjacent subcells.

If the control and memory device 4. has detected the presence of a transponder in the cell formed by the fields $F_1$ and $F_2$, the LF transmitters $S_3$ and $S_4$ are switched to transmitting a transmission signal of same frequency and synchronous with the transmitters $S_1$ and $S_2$, however offset by 180° with respect to them in terms of phase position of the transmission signal as shown in FIG. 3. In the outside cell, consequently, a directed field is provided which, with respect to its phase position, is offset by 180° to the phase position of the transmission signals in the inside cell.

Through the phase position, offset by 180°, of the two directed fields in the overlap region of the two cells a cancellation zone 7 is generated in which no phase position is detectable by the sensing unit associated with the transponder. The fields, phase-offset by 180°, in the two cells form a sharp transition, restricted to a few centimeters, to the cancellation zone 7. If the transponder is moved further from its position 3 into a position within the cancellation zone 7, for example into position 4, the transponder transmits as response signal that pulse sequence with which the information "phase position unknown" is conveyed. After one or a repeated confirmation of this response signal, it can subsequently be determined that the transponder is located in the cancellation zone 7 and thus in the region narrowly outlined by the cancellation zone 7 of the sliding door 2. When the transponder is moved further from its position 4 out of the cancellation zone 7 into the directed field, provided by the fields $F_3$ and $F_4$ of the outside cell, the transponder transmits response signals with the information "phase position 180°" or "phase jump detected".

Since the edge of the directed field in the outside cell is sharply delimited against the cancellation region 7 to a few centimeters, the control and memory device 4 can already recognize at a point in time at which the transponder has just exited the door, that the transponder has now left the building. To verify such a first signal representing the field characteristic of the outer cell, a control signal, indicating that the transponder is located in the outer cell, is the only output by the control and memory device 4 after the response signal corresponding to a predetermined number has been received with corresponding frequency. The control signal output in this case can, for example, impress an alarm unit so that a report is generated indicating that an object has been removed from the building without authorization. The short-cycle query already permits the sound and well-founded alarm triggering at a time at which the transponder, as denoted, for example, by position 5, is still in the region in close proximity to the door 2 such that the person taking the transponder (in the form of the merchandise security tag) along with the merchandise can therefore still be apprehended.

However, the transmission of an alarm signal takes place only if the transponder in a previous identification algorithm has been recognized as not having been enabled.

The above-described process for the spatially-resolved detection of transponders in a detection region in the transition from a first cell to a second cell can be carried out satisfactorily if the transponders are guided through the detection region or configuration 1 with an orientation of their antenna such that the described field characteristics are acquired by the transponder in the represented manner. However, a transponder, with respect to its antenna configuration, can also assume space positions in which, although it is still in the inner cell of the detection region, it already receives signals of one of the LF transmitters $S_3$ or $S_4$ of the outer cell such that, due to the resulting superposition with the directed field located in the inner cell, the response signal "phase position unknown" is transmitted by the transponder. The configuration 1 is switched into a toggle operation according to which alternate switching takes place between the field orientation depicted in FIG. 2 and that in FIG. 4 or between the field orientation depicted in FIG. 3 and FIG. 5. In the transmission operation depicted in FIG. 4, the LF transmitters $S_1$ and $S_3$ transmit the transmission signal with a phase position 0° and the LF transmitters $S_2$ and $S_4$ transmit the transmission signal with a phase position offset by 180°. In this embodiment the fields $F_1$ and $F_3$ or $F_2$ and $F_4$ form directed fields with different phase positions. In this case it is expected that the transponder in the field orientation according to FIG. 4 transmits response signals which can be assigned to a phase position. In the field configuration shown in FIG. 5 the LF transmitters $S_1$ and $S_4$ or $S_2$ and $S_3$, which are each diagonally opposing one another, are operated in phase.

Should a transponder even in toggle operation transmit no unique response signals, this is not critical since it must be assumed in this case that the transponder has not been moved. However, when moving the transponder out of the building, it is necessary to move it so that already after a change of the space position of its antenna configuration it can transmit unique response signals and it is consequently detectable.

By comparing the determined individual successive positions of the transponder with previously determined cell-referred position data, the direction of motion of the transponder can be determined. If such a determination of the direction of motion is also provided within a cell, the above-described toggle operation can be used for this purpose by which the inside cell is divided into two subcells, represented by fields $F_1$ and $F_2$, and the outer cell is also divided into two subcells, represented by fields $F_3$ and $F_4$. It is subsequently possible to determine in which subcell the transporter is located. For this purpose the fields $F_4$ and $F_4$ can also be operated in rotation with respect to the characteristic of their phase position.

In a further modification, instead of the division into two of a cell as described heretofore, a division of a cell into three subcells can be provided. In each subcell is located one LF transmitter as a field-generating device wherein the antennas of the transmitters are disposed such that they radiate in different directions. The three transmitters of this cell are impressed with a transmission signal phase-shifted by 120°, wherein it is provided to operate in rotation the subcells with respect to the phase-shift to be transmitted. The adjacent cell is structured in the same way. The two cells can be operated in phase shift with respect to one another. Thereby a more precise localization of the transponder within a cell as well as also between the cells can be attained.

It is thought that the invention and its advantages will be understood from the foregoing description and it will be apparent that various changes may be made thereto without departing from the spirit and scope of the invention or sacrificing all of its material advantages, the form hereinbefore described being merely preferred or exemplary embodiments thereof.

We claim:

1. A process for detecting a transponder in a detection region structured into at least two adjacent overlapped cells in which the transponder is detectable with reference to a particular one of the cells, said detecting process comprising the steps of:
    (a) providing in each of the at least two adjacent overlapped cells a field with a detectable field characteristic;
    (b) acquiring the field characteristic of a first of the cells using a sensing unit of the transponder;
    (c) cyclically transmitting a response signal from a transmitting unit of the transponder containing the acquired field characteristics;
    (d) receiving the response signal by a receiver which contains response signal information regarding the acquired field characteristic;
    (e) evaluating the response signal with respect to the information of the acquired field characteristic contained in the receiver;
    (f) comparing the acquired field characteristic with field characteristics provided in the cells;
    (g) determining the possible position(s) of the transponder on the basis of the results of the performed comparison; and
    (h) verifying a position determination wherein after the detection of a transponder in the first cell the field characteristic of the adjacent cell is adjusted such that it differs from that of the first cell.

2. The process of claim 1 wherein the verification of a position determination of a transponder is carried out by comparing the information of the currently received response signal with that of the previously received response signal, and a position determination is considered to correspond to the actual one if at least two successive response signals contain the same field characteristic information.

3. The process of claim 1 wherein the verification of a position determination of a transponder takes place through the predetermined changing of the field characteristic in the first cell and reception of a corresponding response signal.

4. The process of claim 1 wherein the fields of the at least two adjacent overlapped cells are formed by low-frequency electromagnetic radiation of same frequency and synchronous in all cells, with the fields being differently adjustable for the differentiation of the cells with respect to their phase position such that upon the transponder entering fields, differing with respect to their phase position, such fields can be detected through their different phase positions.

5. The process of claim 4 wherein the phase position in a field contained in a cell is changed by 180° in order to bring about a differentiation against another cell.

6. The process of claim 1 wherein each of the at least two cells are divided into at least two subcells in which in a first detection step in each instance same-phase fields are generated and in a further step the fields located in the subcells are adjusted to differ with respect to the field characteristics to be detected and that the field characteristics in these subcells toggle between the two operating modes.

7. The process of claim 1 wherein the response signal of the transponder is transmitted on an HF channel.

8. The process of claim 1 wherein time-coded pulses are used as the response signals of the transponder and one response signal comprises one or several pulses of identical or different lengths.

9. The process of claim 1 wherein a plurality of transponders are used and to each transponder of the plurality a time slot is assigned within a given time unit, to which time slot the cyclical transmission of the response signal of a given one of the transponders is coupled and within which the response of the given one transponder is received.

10. A configuration for detecting a transponder in a detection region structured into at least two adjacent overlapped cells in which the transponder is detectable with reference to a particular one of the cells, said detecting configuration comprising:
    (a) a plurality of stationary field-generating devices each associated with a respective one of the at least two adjacent overlapped cells and for generating a field with detectable field characteristics changing at predetermined time intervals, said devices being operable with identical field characteristics as well as with differing field characteristics;
    (b) a transponder having a sensing unit operable for acquiring detectable field characteristics or changes thereof and a transmitting unit operable for transmitting response signals containing the acquired field characteristics in response to the operation of said sensing unit;
    (c) a receiver for receiving the response signals transmitted by said transmitting unit; and
    (d) a control and memory device connected to said field-generating devices for driving said field-generating devices and connected to said receiver for evaluating the response signals received by said receiver.

11. The configuration of claim 10 wherein the fields located within the cells and provided by the field-generating devices are transmitted at low frequency, the same frequency and synchronously.

12. The configuration of claim 11 wherein the field-generating devices can be impressed with different phases.

13. The configuration of claim 12 wherein the sensing unit of the transponder is operable for detecting changes of field characteristics which manifest as different phase positions.

14. The configuration of claim 13 wherein the phase positions of the fields contained in the cells are offset by 180° with respect to one another.

15. The configuration of claim 10 wherein each of the cells of the detection region is divided into at least overlapping subcells with a separate field-generating device associated with each subcell such that the fields located within the respective subcells can be adjusted so as to differ from each other with respect to the field characteristics to be detected.

16. The configuration of claim 10 wherein the transmitting unit of the transponder and the receiver connected to the control and memory device operate in the high-frequency range.

17. The configuration of claim 10 wherein the cells of the detection region are divided into multiple overlapping subcells with separate field-generating devices associated with the respective subcells and having antennas adapted to radiate in different directions and which multiple subcells are operated in rotation with respect to their field characteristic.

18. The configuration of claim 17 wherein the adjacent cells are operated in phase shift with respect to one another.

19. The configuration of claim 10 wherein the transponder is a security tag for safeguarding goods in an exit region of a building in order to determine whether the goods is still within the building or already outside of the building.

20. The configuration of claim 19 wherein the detection region is disposed with the first cell in an interior of the building and with the adjacent cell, regionally overlapped with the first cell, outside of the building and the overlap region of the two cells covering a door area of the building.

* * * * *